(12) United States Patent
DeKoning et al.

(10) Patent No.: US 6,384,842 B1
(45) Date of Patent: May 7, 2002

(54) USER INTERFACE TO PROVIDE A PHYSICAL VIEW OF MOVABLE PHYSICAL ENTITIES

(75) Inventors: Rodney A. DeKoning, August; William P. Delaney, Wichita, both of KS (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/311,220

(22) Filed: May 13, 1999

(51) Int. Cl.[7] ................................................. G06F 3/00
(52) U.S. Cl. ..................... 345/734; 345/735; 345/736; 345/771; 345/835; 709/223; 709/224
(58) Field of Search ................................ 345/734, 735, 345/736, 771, 966, 965, 970, 839, 835, 775; 700/83; 709/223, 224

(56) References Cited

U.S. PATENT DOCUMENTS

| | | | | |
|---|---|---|---|---|
| 5,452,415 A | * | 9/1995 | Hotka | 345/161 |
| 5,500,934 A | | 3/1996 | Austin et al. | 395/755 |
| 5,644,728 A | | 7/1997 | Pillans et al. | 395/243 |
| 5,671,408 A | | 9/1997 | McBride | 395/611 |
| 5,751,965 A | * | 5/1998 | Mayo et al. | 709/224 |
| 5,850,539 A | * | 12/1998 | Cook et al. | 395/500 |
| 5,903,913 A | * | 5/1999 | Ofer et al. | 711/156 |
| 5,956,665 A | * | 9/1999 | Martinez et al. | 702/188 |
| 5,991,759 A | * | 11/1999 | Knoblock et al. | 707/10 |
| 6,259,678 B1 | * | 7/2001 | Christian et al. | 370/254 |

OTHER PUBLICATIONS

Customizable Graphic Displays; Harris Network Manager; 8 pages; Worldwide Web; Sep. 30, 1997.
CINeMa (Computer Integrated Network Management); 7 pages; Worldwide Web; Sep. 30, 1997.
MtCrimp for Windows; 5 pages; Worldwide Web; Sep. 30, 1997.
Plex View for Windows; 8 pages; Worldwide Web; Sep. 30, 1997.
NetViz; 16 pages, Worldwide Web; Sep. 30, 1997.

* cited by examiner

*Primary Examiner*—Raymond J. Bayerl
*Assistant Examiner*—Cuong T. Thai

(57) ABSTRACT

A graphical user interface is provided to represent relative and absolute physical locations of all RAID system components. Numerous graphical representations are defined. These graphical representations represent, in whole or in part, RAID system components such as disk drives, storage array controllers, controller and drive trays, power supplies, fans, software versions, hardware interfaces, connectors and/or cabling or wiring. The graphical representations are selected and arranged using a display screen. Their selection and arrangement are based on actual physical locations of their corresponding system components. The combined graphical representations can be used to check status of one or more system components, find and access the actual system components and/or update, either under user control or system control, the graphical representations to reflect any changes made to the corresponding actual RAID system components.

13 Claims, 5 Drawing Sheets

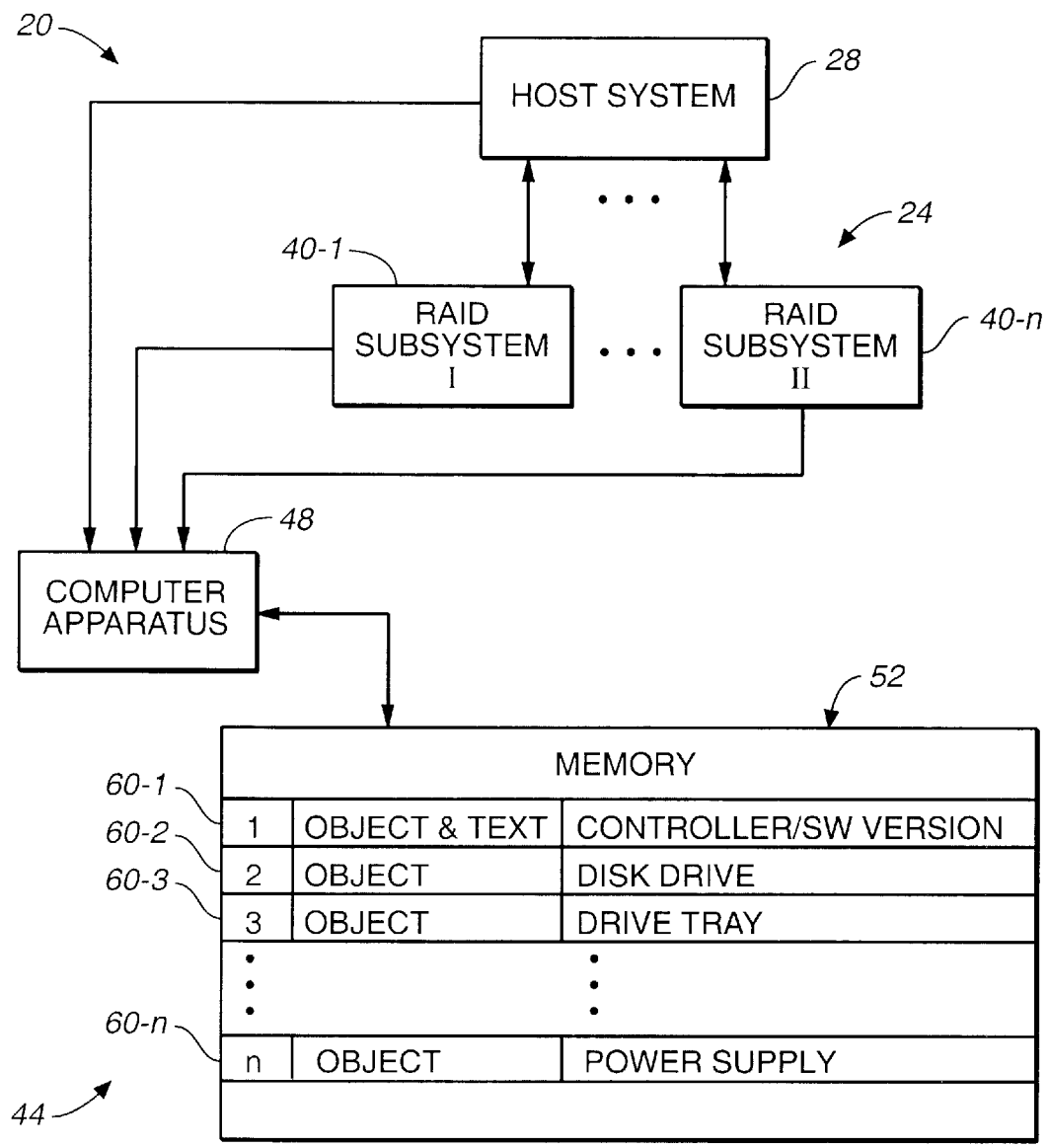
FIG._1

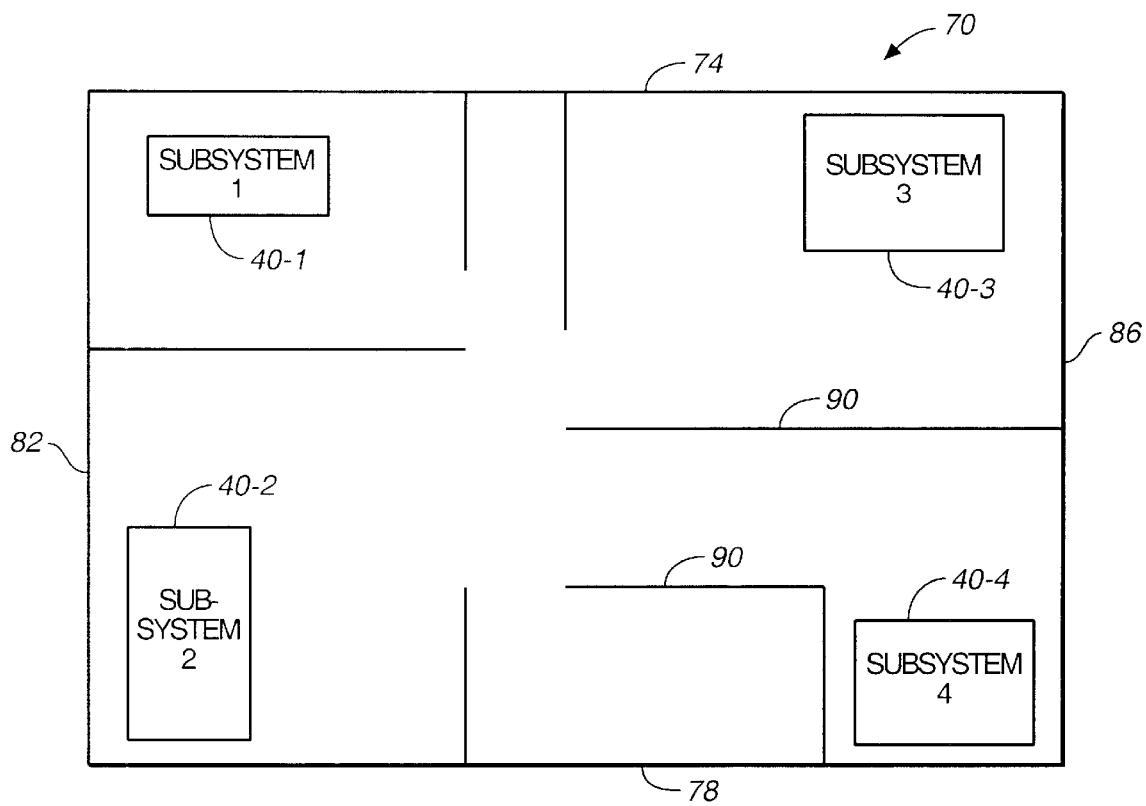
*FIG._2*
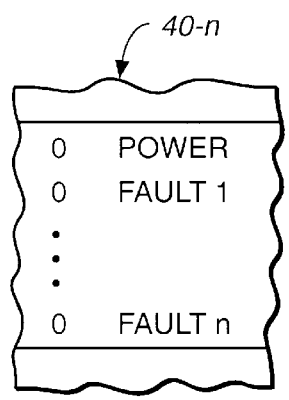
*FIG._6*

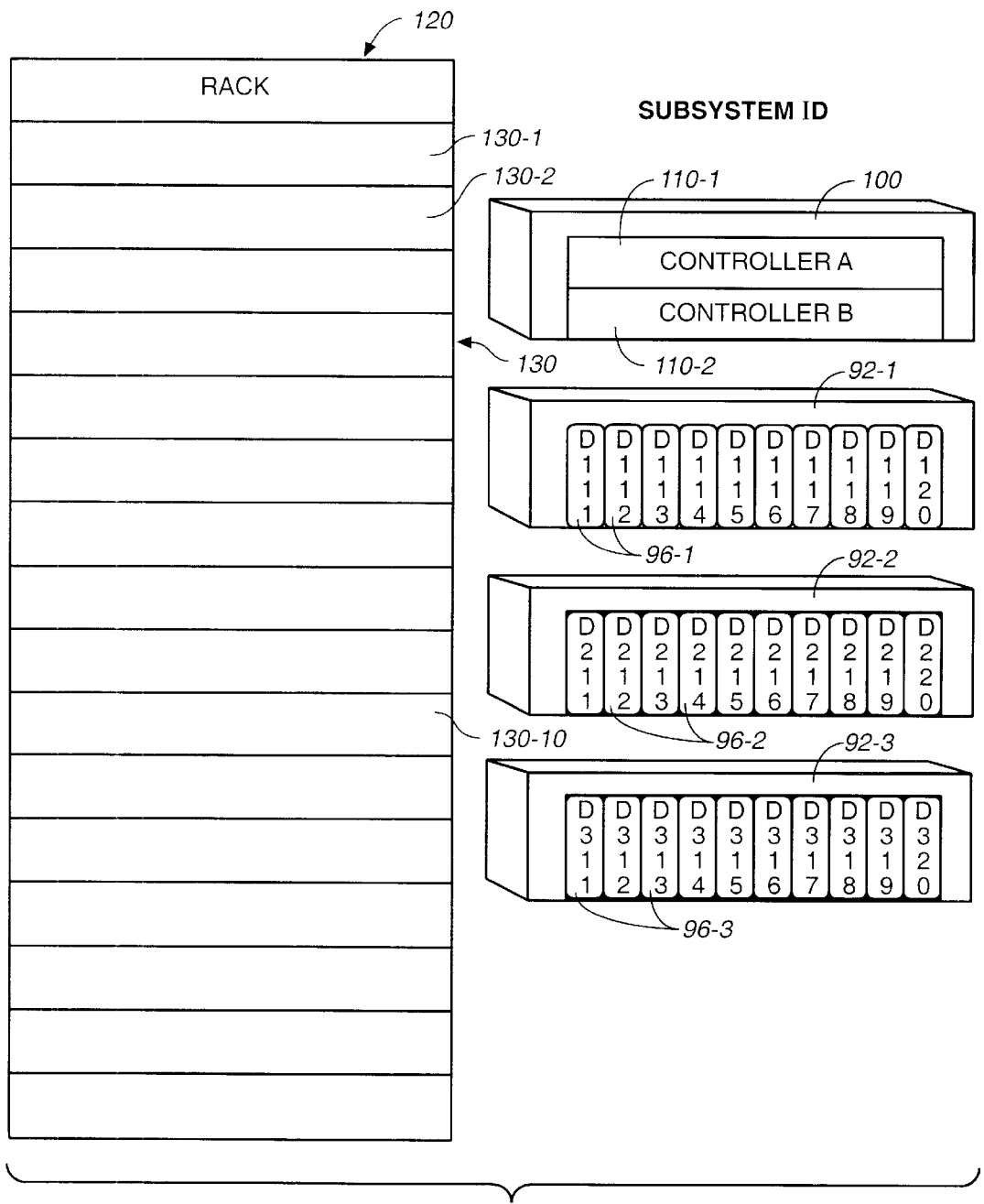
FIG._3

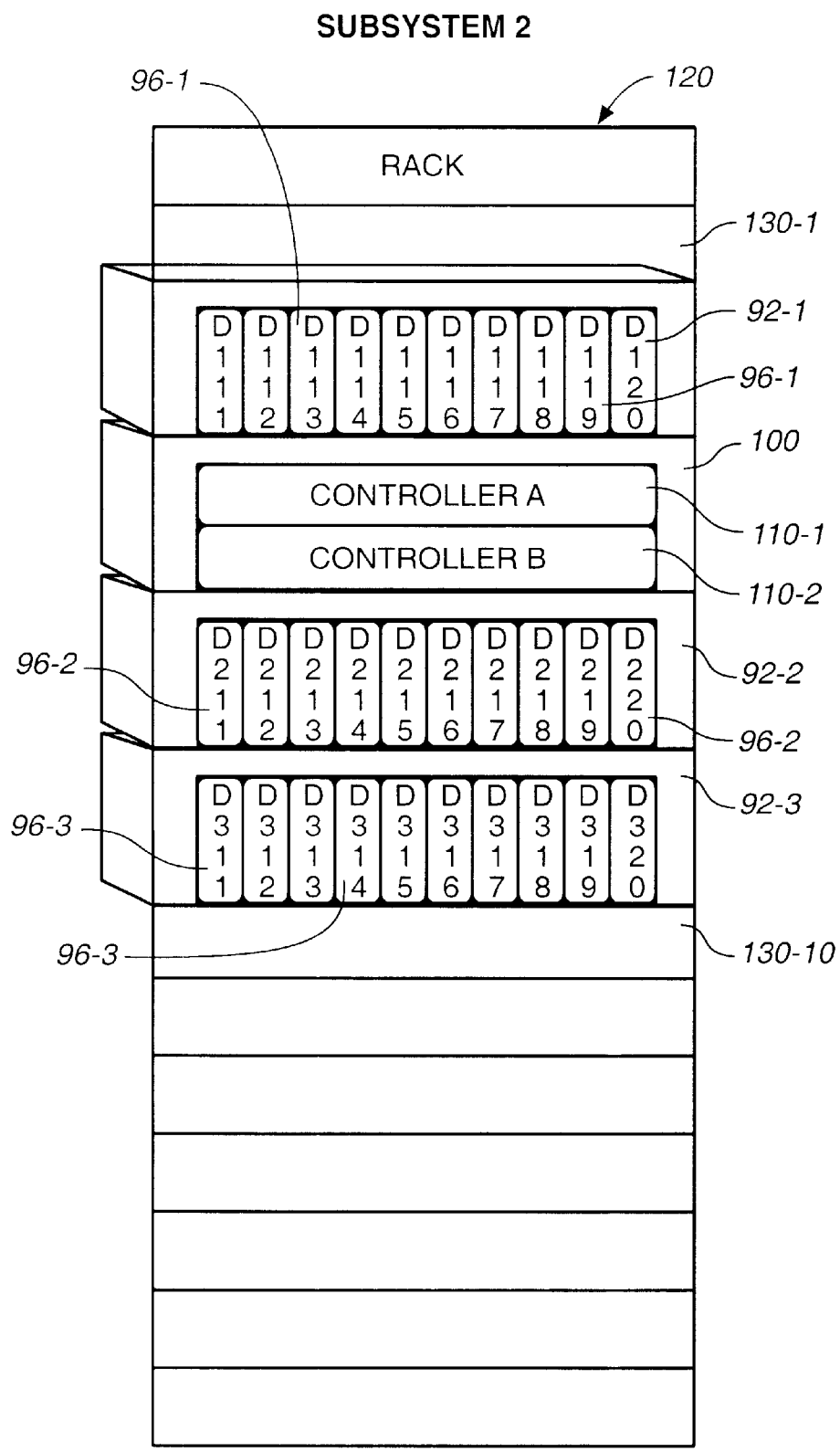
FIG._4

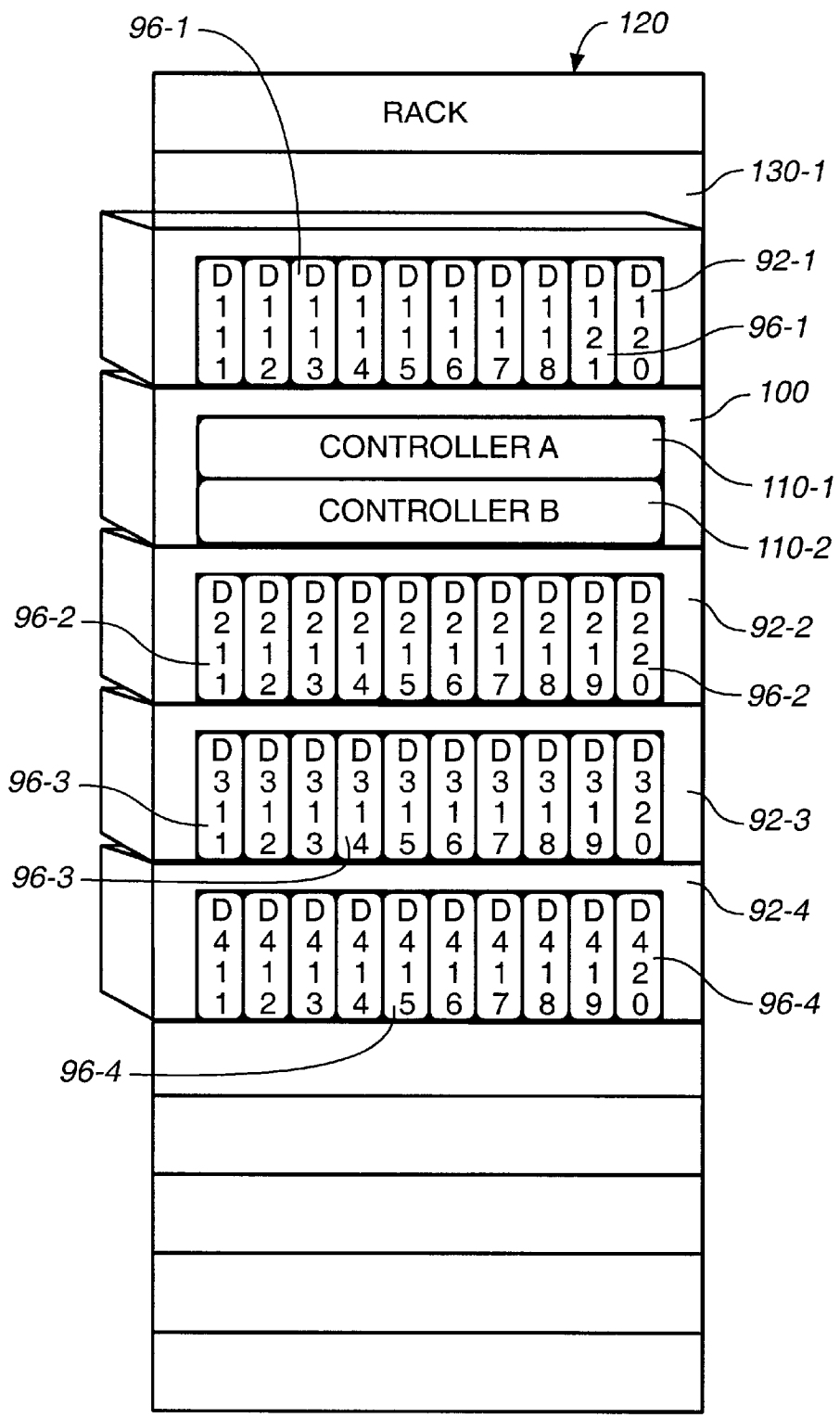
FIG._5

USER INTERFACE TO PROVIDE A PHYSICAL VIEW OF MOVABLE PHYSICAL ENTITIES

FIELD OF THE INVENTION

The present invention relates to graphical representations of system components and, in particular, to displaying graphical representations that illustrate relative and absolute physical locations of disk memory system components located in a room.

BACKGROUND OF THE INVENTION

Computer systems can comprise a substantial number of components, together with the equipment that supports and/or interfaces with such components. These can include memory storage devices, controllers, equipment racks, component or module trays, power supplies, interface devices, software, hardware connectors and cabling or wiring. A RAID (redundant array of inexpensive disks) is comprised of numerous such components. A RAID system has a large number of disk drives and controllers that have supervisory control over the disk drives and other environmental components. These components, as well as other RAID system components, are commonly supported in one or more racks having slots and/or subslots into which the system components are inserted. Since RAID system components can be arranged differently when they are installed at particular user sites, each physical arrangement or placement of these system components may be different for each such site. In that regard, the racks or other RAID system support structures are housed in parts of one or more selected rooms in the building having the RAID system. The system components are typically then positioned in such racks according to a suitable arrangement. In the case of any given RAID system, it is commonplace to use a host machine that has overall control of read/write operations conducted by the RAID system. However, the host machine may not be aware of the physical locations of all RAID system components. If an operator of the RAID system wants to access a particular RAID system component, the operator must determine its physical location among the large number of RAID system components. The operator might want to replace or move a particular system component in the RAID system and must know its location in order to perform the task. It is known to store and display component lists for RAID systems. RAID systems also currently have the capability of providing information regarding the identification and location of some components in the system, such as relative locations of disk drives in a drive tray. Such available information does not clearly and immediately provide the user with the relative and absolute physical locations of all RAID system components.

It would be advantageous, therefore, to be able to graphically illustrate relative and absolute physical locations of RAID system components so that an operator could more easily find a particular component or components among a substantial number thereof.

SUMMARY OF THE INVENTION

In accordance with the present invention, method and system are provided that implement a graphical user interface for displaying, on a display screen or monitor of a computer system or user machine, numerous graphical representations of actual relative and absolute physical locations of system components, preferably RAID system components. When viewed on the display screen, the operator can ascertain the location of one or more selected PAID system components, e.g., identify its location in order to readily find and access the actual system component in the room having numerous system components. Importantly, each graphical representation can be updated when a change occurs in its corresponding physical RAID system component. Depending on the type of system component, some updating can be accomplished substantially automatically without user operations or interventions. Other RAID system components require user control in order to accomplish the updating. Updating can also include providing status information for one or more RAID system components.

The graphical representations include geometric designs that schematically or pictorially represent the actual system components. For example, a rack for holding system components or modules is illustrated as a box-like unit having separated compartments or slots into which smaller quadrilateral-shaped items representative of disk drives and disk controllers are positioned. The graphical representations are indicative of a variety of system components such as the system racks, disk drives, storage array controllers, disk trays, controller trays, power supplies, fans, interface units, hardware connectors, cabling and/or wiring. System components can also encompass or include combinations of other system components, such as a combination of a controller and a controller tray, which combination could also be labeled a controller module. The user or operator of the computer system is able to select from among such numerous graphical representations and combine them on the display screen to graphically represent the actual arrangement of the system components in a room of a building or other physical area. At least some of the resulting graphical representations can include indicators or other indicia that convey the status information associated with the corresponding one or more of the actual system components. Such status information can include, for example, whether power is being applied to that system component and/or whether or not that system component has experienced one or more predetermined faults.

The computer system of the present invention is used in processing, displaying and otherwise controlling operations related to such graphical representations. In one embodiment, a number of computer systems are employed. The computer system typically comprises computer hardware such as one or more processors, the monitor having the display screen, program memory and storage memory (e.g. hard disk drive storage memory) for storing data indicative of the numerous graphical representations and input devices including a keyboard and mouse. The geometric shapes, which represent one or more system components or parts of a system component, are built or developed and stored in the storage memory in a readily accessible manner. Such graphical representations can be defined as including an object form that represents a system component or part thereof and/or text that may, but need not, accompany the object form. The text might be useful in further defining the particular component pictorially illustrated by the object form, such as a certain disk controller that differentiates it from other disk controllers.

The computer system(s) can operably communicate with one or more of the RAID memory systems. Each, or all of such, RAID system(s) may be conveniently further defined as including a number of RAID subsystems, for example, when illustrating or otherwise defining their locations in different rooms or different parts of the same room. One or more host systems is typically in communication with the RAID memory system(s). Such a host system may be involved in controlling read/write operations of the data or other information relative to, for example, a particular one or more of the RAID systems. In one embodiment, one or more of such host systems are able to also directly communicate with the computer system.

With respect to Utilizing the numerous graphical representations, in one embodiment, the RAID system is set-up or configured in one or more rooms and in one or more parts of the same room. That is, the RAID system components are shipped from the manufacturing location or other site to the designated user geographical site. The user can then arrange or assemble the system components in accordance with a desired or predetermined physical configuration in which each system component has a relative location to the other system components, as well as an absolute physical location in a particular part of a room or other area. The user also has the computer system with memory that stores the software package or software modules required for establishing the graphical user interface for utilizing the numerous graphical representations of system components. That is, the software includes the numerous graphical representations in object form (geometric shape) and/or object form with text. Each of these is stored at a known memory location. The operator can then select the appropriate graphical representations of the actual system components for the particular RAID system. The selection ultimately results in graphical representations of the system components being illustrated on the display screen. These can be combined with each other so that the resulting illustration corresponds to the actual locations of the system components relative to each other. By way of example, system components that are modules or combinations of system components are displayed in a RAID support structure, such as a rack, in accordance with their actual arrangement relative to each other. The resulting combination of display system components can also be represented so that they correspond to the actual absolute locations that the system components have in a rack, or even in a room or area of the building. Such can be accomplished by illustrating indicia representative of parts or sections of a room and causing the system components to be displayed on the display screen in those room areas that correspond to the actual physical locations of such system components. Once the graphical representations are properly arranged to be indicative of actual relative and absolute physical locations of system components, they can be stored for later retrieval and usage.

When it is useful or desired to obtain information related to the RAID system(s), the graphical representations of the particular RAID system, including providing a display of their relative and absolute physical locations, together with status information, can be provided. Hence, when necessary or as part of a normal procedure, the operator can check one or more system components. Relatedly, when desired or necessary to find and access a particular system component, using the illustration on the display screen for any such system component, the operator can determine its relative and absolute physical location. Upon obtaining this information, the operator can then physically access the actual system component based on the correspondence between its actual location and that illustrated on the display screen. This is beneficial, for example, in immediately finding and removing and/or replacing or shifting any such system component. When such a change is made to an actual system component, the graphical representation thereof is updated. By way of example, an actual first system component may be removed and replaced by an actual second system component. In such a case, assuming a difference in their graphical representations, the graphical representation of the second system component now occupies the location, in the combination of graphical representations, formerly occupied by the graphical representation of the first system component. Such a graphical representation change manifests itself in one or both of a graphic change and a text change. As a further example, a particular system component might be added to a combination of previously established or arranged system components. This new system component has its own graphical representation and it is added to the previously configured combination of graphical representations.

With respect to these changes to previously devised combinations of graphical representations, depending upon the type of system component, the update to the combinations of graphical representations may be accomplished either under system control (automatic update) or user/ operator control (manual update). In the case of moving one disk drive from a drive tray and replacing it with another disk drive, the update to the graphical representation can occur automatically. A storage controller of the RAID memory system can signal the computer system with information related to this particular change, since the storage controller is able to keep track of identities and relative locations of disk drives. Since the drive tray was not changed, only a disk drive therein was removed and replaced, the storage controller can provide this information to the computer system to effect an automatic update of any appropriate change in the graphical representation, such as an identification of the replacement drive. In the example in which a new system component is added, if it were a drive tray and disk drives therein, the storage controller prompts or otherwise notifies the computer system that such a system component was added. However, no indication or notification is provided as to where this module (combination of drive tray and disk drives) was added. Consequently, no automatic update of the combination of graphical representations is available for this new drive tray and disk drives. Nonetheless, based on the prompt received by the computer system, the user can incorporate this change based on the user's knowledge of where the corresponding actual drive module was located, namely, both its absolute position and its position relative to other system components. Accordingly, the RAID memory system, such as one or more storage controllers thereof, can maintain or store the updated identifications and locations of actual system components and provide a list or information related to the current system components to the computer system. The computer system, including when under control by an operator or user, can then decide what to do with such current or updated information. The RAID memory system may be utilized by one or more host machines or systems. The storage controller(s) thereof can function as a central site or location for such available configuration information relative to a plurality of these host systems. Consequently, once a list of system components is available, it can be accessed by a number of different systems.

Although it is anticipated that a primary benefit of the present invention is to graphically represent system components after the actual relative and absolute physical locations have been determined, it is anticipated that the present invention could be used to identify locations for the system components before they are configured relative to each other. In this way, the graphical representations of their locations are first provided and then the actual physical locations are established based on such graphical representations. In one embodiment, a default combination of graphical representations can be utilized for a predetermined memory system, such as a particular RAID system.

Based on the foregoing summary, a number of benefits of the present invention are readily discerned. Method and system are provided to graphically represent relative and absolute physical locations of system components, particularly RAID system components. Graphical representations of actual RAID system physical configurations can be graphically built by the operator after installation. Alternatively, the actual system components can be physically arranged based on a previously developed combination of graphical representations thereof. Once established and stored in memory, the combination of graphical representations indicative of actual relative and absolute physical locations of the system components can be used in order to check status of system components, identify their locations, access one or more of such system components based on determining where each is located using such graphical representations, remove, replace, shift and/or add actual system components, as well as update the graphical representations to reflect whatever modification was made either under operator control or system control.

Additional advantages of the present invention will become readily apparent from the following discussion, particularly when taken together with the accompanying drawings.

BRIEF DESCRIPTION OF THE DRAWINGS

FIG. 1 is a block diagram illustrating major apparatuses of the present invention;

FIG. 2 schematically illustrates on a display screen graphical representations of subsystems based on their actual absolute locations in a room;

FIG. 3 schematically illustrates on the display screen selected system components of a subsystem of FIG. 2 that are provided separately on a display screen for desired arrangement relative to each other;

FIG. 4 schematically illustrates on the display screen the system components of FIG. 3 that have been combined based on the relative physical locations of actual corresponding system components.

FIG. 5 schematically illustrates on a display screen graphical representations of system components that have been changed over those illustrated in FIG. 4; and FIG. 6 is an enlarged, fragmentary schematical illustration of a graphical representation of a system component that provides status information for that system component.

DETAILED DESCRIPTION

With reference to FIG. 1, a system 20 of the present invention is presented in block diagram form with major blocks thereof being illustrated. The system 20 includes, in the preferred embodiment, a RAID storage array or memory system 24 for providing and/or controlling data and other information. The storage array 24 can communicate with one or more host system(s) 28 that utilize the data or other information contained by the storage array 24. The storage array 24 preferably includes one or more RAID subsystems 40, where subsystems can refer to one or more components of one RAID system or one or more components of a number of RAID systems. In the case in which a RAID subsystem has a number of components, such components might include a plurality of the following: disk controllers, controller software versions, controller trays, disk trays, disk drives, power supplies, fans, interface units, racks or other support structures and/or wiring/cabling. The definition of these components also encompasses combinations thereof, such as a combination of a controller tray and a controller (e.g. controller module).

As part of installing a RAID system having a number of components, such components are typically shipped to the geographic site where the components are to be installed to provide a working RAID system. In that regard, the user or owner of the RAID system decides or is otherwise involved in the actual physical arrangement of the system components. The system components could be housed in one or more rooms of a particular building, or in different sections or areas of the same room. By way of example only, a storage rack for containing a number of system components or modules could be set up in an area of a designated room and such modules or components could then be inserted or otherwise installed in the storage rack by locating them in desired, determined or predetermined positions relative to each other. Such physical arrangements of system components are typically documented, at least at the time or shortly after the time in which they are installed, so that there is documentation or a record related to such components. However, it may be difficult or inconvenient to efficiently identify actual relative and absolute physical locations of such components when an operator or user may have a need to access one or more of these RAID system components. In order to facilitate or otherwise assist in ascertaining the location of a desired system component, the overall system 20 includes a computer system 44 that, in one embodiment, is in communication with the host apparatus 28 by means of a computer apparatus 48. The computer apparatus 48 includes one or more processors and/or controllers that perform common processing tasks. Additionally, the processor(s) of the computer apparatus 48 has responsibility for executing and controlling, under user directions/inputs, one or more software modules or programs for correlating or otherwise providing correspondence between actual RAID subsystem components 40 and a number of graphical representations of such components. In accomplishing these tasks related to providing such correspondence, the computer apparatus 48 also includes a monitor having a display screen, together with one or more input devices, such as a keyboard and a mouse. The display screen is able to display such graphical representations that can be manipulated or positioned by the user of the computer system 44. Such a graphical user interface (GUI) is highly beneficial in assisting the user in obtaining information concerning the actual physical locations of RAID subsystem components 40, as will be further discussed herein.

The computer system 44 also includes a memory 52 having a number of memory locations 60. In one embodiment, the memory 52 stores, at least among other things, numerous graphical representations. In another embodiment, one or more of these graphical representations are stored at the storage array, which can be a central location for such information, particularly where a number of host systems are utilizing the storage array 24. The graphical representations depict, in a graphical format, each of the different RAID subsystem components 40. For example, memory location 60-3 might store information indicative of a drive tray of a RAID system 32. The actual physical drive tray may contain one or more disk drives. This graphical representation can be in an object form, such as a box or other geometric shape (e.g., quadrilateral-shaped). The graphical representation may include text that accompanies the geometric shape, with the text providing further information related to identifying the particular system component. As can be appreciated, it is usually desirable to have different graphical representations for different system components. When the system components are essentially the same, such as common disk drives, it may be beneficial to differentiate among them using text or some other acceptable indicia.

When utilizing the graphical representations, the computer apparatus 48, by means of the appropriate software control and pursuant to user directions, is able to access the memory 52 and particularly access selected graphical representations from the predetermined memory locations. Such accessing results in the selected graphical representations being provided on the display screen of the monitor of the computer apparatus 48. The operator of the computer apparatus 48 can use these graphical representations in connection with graphically representing actual relative and absolute physical locations of the PAID subsystem components 40.

With reference to FIG. 2, further descriptions related to utilizing such stored graphical representations is next described. In particular, a display on the display screen of the computer apparatus 48 is illustrated related to different RAID subsystems 40-1, 40-2, 40-3, 40-4 and which are identified as subsystem1, subsystem2, subsystem3 and subsystem4 respectively. The actual absolute and relative physical locations of the subsystems 40-1 through 40-4 are provided. The display includes a schematic representation of a certain room in a particular building that houses these RAID subsystems. As shown in FIG. 2, the room is depicted schematically in the form of a top view thereof. More particularly, the represented room 70 has a rear wall 74, a front wall 78 and first and second sidewalls 82, 86. Different areas of the room 70 are defined using interior walls or barriers 90. For example, subsystem2 40-2 is depicted as being in a front, left area of the room 70 in connection with representing the corresponding actual physical location of subsystem2 40-2 including components thereof. As can be further understood, the schematic representation of the room 70 also informs the user, who is viewing the display, of relative locations of the other subsystems 40-1, 40-3, 40-4. That is, the user viewing the display immediately becomes aware that subsystem1 40-1 has a physical location in the same room and is behind subsystem2 40-2 and is more adjacent rear wall 74.

In conjunction with providing further information regarding the absolute physical locations of such subsystems 40-1 through 40-4, text is also included on the display screen. Such text identifies the building and room containing such subsystems 40. Additionally, the terminology subsystem1, subsystem2, subsystem3, subsystem4, provides an identifier for each such subsystem and can correspond to the name or identifier given to each such subsystem by the owner/user.

With respect to providing such graphical representations for display or later display, the user is provided with the capability, when first accessing such a screen, to place the individual components or modules in rack or supporting structure positions as they actually exist in the room of the particular building. Such configuring by the user enables the user to provide an exact replication of actual relative and absolute physical locations of the one or more RAID systems and/or subsystems thereof. It should be understood that the software associated with managing modules or components of the RAID system is not aware of the order or physical placement of the components or modules relative to their support structures. Consequently, it is necessary for the user to provide the accurate representation of system or subsystem components, which corresponds to such physical locations.

With reference to FIG. 3, the building or developing of such a configuration that corresponds to relative physical locations is next described in the context of an example involving subsystem2 40-2 of FIG. 2. As seen in FIG. 3, a number of RAID system components or modules are illustrated, together with a rack supporting structure into which such system components will be inserted. The locations of the system components in the rack will correspond to their actual physical locations relative to each other.

In developing this correspondence between graphical representations on the display screen and actual physical locations, the user, who is aware of certain aspects related to the RAID system including the components or modules to be represented, together with the structure(s) that contain(s) them, utilizes the computer apparatus 48 to retrieve the graphical representations of such system components as provided by the RAID storage array 24. With respect to subsystem2 40-2 components, the graphical representations of the actual system components can be retrieved from predetermined locations in the memory 52. The graphical representations of the system components depicted in FIG. 3 have been obtained from the memory 52, as well as the graphical representation of a support structure for them. Specifically, graphical representations of drive trays 92-1, 92-2, 92-3 have been selected and displayed. For each of these drive trays, 92-1, 92-2, 92-3, a predetermined number of graphical representations of disk drives 60 are displayed. For the drive trays 92-1, 92-2, 92-3, the sets of disk drives 96-1, 96-2, 96-3 are obtained. These are illustrated on the display screen as already inserted into or combined with their respective drive trays 92-1, 92-2, 92-3. However, it should be appreciated, that such graphical representations of disk drives 96 could be individually obtained from the memory 52. Under user control, each of such graphical representations of a disk drive 96 could be manipulated to be positioned within their respective drive trays at 96-1, 96-2, 96-3, as currently reflected in FIG. 3.

Additional graphical representations obtained from the memory 52 for the subsystem2 components include a controller tray 100 and storage array controllers 110-1, 110-2. A graphical representation of the controller tray 100 could have the same geometric representation as each of the drive trays 92. As also depicted in FIG. 3, the two controllers 110-1, 110-2 can be differentiated from each other by means of identifying text within the object form of the graphical representations of these two controllers 110-1, 110-2.

Like the disk drives 96 and the drive trays 92, the graphical representations of the controllers 110-1, 110-2 could be displayed separately from the controller tray 100 when retrieved from the memory 52. Under a user control, these graphical representations could be combined, as illustrated in FIG. 3.

The graphical representations also include a rack 120 having a number of slots, sub-slots or other defined areas 130. Such slots 130 constitute relative locations in the rack 120. Consequently, placement or insertion of graphical representations of RAID system components results in a graphical presentation of relative actual locations of these system or subsystem components. In that regard, under user control, the system components of FIG. 3 (drive trays 92, disk drives 96, controller tray 100 and controllers 110-1, 110-2) are manipulated or otherwise controlled to be combined with the rack 120 using the slots 130 thereof. Such resulting combination is illustrated in FIG. 4. In this example or embodiment, the user is building graphical representations of system components based on their actual physical locations for the RAID system. Consequently, FIG.

4 depicts graphical representations arranged relative to each other in order to reflect actual physical locations of the corresponding system components. The user, therefore, controls the graphical representations of the combination of the drive tray 92-1 and the disk drives 96-1 so that they are located in slots 130-2, 130-3 of the rack 120. The actual physical locations of the controllers 110-1, 110-2, together with the controller tray 100, must have their graphical representations moved to be inserted in the slots 130-4, 130-5 of the graphical representation of the rack 120 since such graphic positions correspond to the physical locations of the corresponding system components in the actual rack. Similarly, drive trays 92-2, 92-3, with their associated set of disk drives 96-2, 96-3 have their graphical representations controlled to be placed in the graphical representations of the rack 120 at slots 130-6 through 130-9, respectively. FIG. 4 thereby pictorially represents the relative locations of the actual system components of subsystem2 40-2. The combination of graphical representations of FIG. 4 can be stored in the memory 52 or with the RAID storage array 24 for later retrieval and use, as will be subsequently discussed.

Although the explanation just given is directed to forming arrangements of graphical representations of system components, based on the knowledge of the actual physical locations of RAID system components that correspond thereto, it should be appreciated that other uses of the invention can be made. For example, such graphical representations could be combined before the set up of the actual physical components in a room of a building. That is to say, the graphical representations of system components could be arranged to reflect what the actual layout of system components will be at a particular site. Such arrangements of graphical representations before actual system component installation could be done at the manufacturing facility of the RAID system. If desired or necessary, this initial illustration of graphical representations of system components could be changed where the user makes changes or does not exactly follow the arrangements of the graphical representations when the RAID system components are installed. In a related embodiment, the RAID storage array 24 stores, such as in storage controller firmware or associated storage, a default or standard form of graphical representations that depict a particular RAID hardware configuration that can be utilized by the RAID system owner if it chooses. This standard RAID hardware set up may be based on a common arrangement of system components that is typically implemented by one or more RAID system owners or users.

With reference to FIG. 5, a further description is provided related to accessing and using such a combination of previously configured graphical representations that correspond to relative and absolute physical locations of actual system components Assume that the user or operator has determined it appropriate or necessary to remove and replace a certain disk drive of subsystem2 40-2 that is graphically represented in accordance with FIG. 4. As an example, such a change might include: (1) removal of the drive identified as D119 of the set of drives 96-1 from the drive tray 92-1, with this drive D119 represented graphically and by text as the second drive from the right side in drive tray 92-1 of FIG. 4; and (2) replacement of the D119 drive by a new drive identified as D121. These changes are reflected in FIG. 5 that shows, instead of the graphical representation of drive D119, drive D121 being represented in drive tray 92-1 and being next to drive 120 at the right side of drive tray 92-1. In a preferred embodiment, this update to the graphical representation of FIG. 4, and as illustrated in FIG. 5, is accomplished by system control without operator intervention. Specifically, the storage array 24, such as with a storage controller thereof, provides a signal as an indication that drive D121 is located in drive tray 92-1 between drives D118 and D120. This indication or notification from the storage array 24 is utilized by the computer system 44 to automatically update subsystem2 40-2 so that its combination of graphical representations is that as illustrated in FIG. 5. The updating to reflect this change in a disk drive relies on information being provided by the RAID storage array 24. With this available information, the graphical representation of subsystem2 40-2 can be automatically updated to reflect the removal and replacement of a disk drive. Other system components that might be changed can also be updated under system control (substantially automatically), such as changes to controllers 110-1, 110-2, while other system components require operator intervention in order to reflect the change that was made.

As a further example, another change might be adding a drive tray 92-4 having another set of drives 96-4 to slot 130-10 of subsystem2 40-2. The graphical representations of these additions are illustrated in FIG. 5. The addition of this drive module or combination of storage array system components to subsystem2 results in the host system 24 notifying the computer system 44 that disk drives 96-4 have been added to subsystem2. This prompt or notification provides information regarding the relative locations of the disk drives with respect to each other. Such information, however, does not include the location of the added drive tray 92-4. There is no signal indication regarding where this drive tray 92-4 was positioned in the rack 120 of subsystem2. Consequently, no automatic update of such a graphical representation of the drive tray 92-4 with its accompanying drives 96-4 can be provided. The user or operator, however, with the knowledge of the positioning of the drive tray 92-4, can graphically position the drive tray 96-4 in the correct slot 130-10 of the rack 120 using the computer apparatus 48. Upon completion of such revisions to reflect new actual locations of system components, the updated version of subsystem2 40-2 can then be stored in the memory 52 for later access. As can be appreciated, there may be other system components for which operator intervention is required to update their graphical representations based on changes of the corresponding physical system components, such as controller trays 100. It should be further understood, as another example, that an entire subsystem could be moved from one physical location in a room to another physical location in the same room or another room. In such a case, similar procedures are followed to update the graphical representations so that they correspond to the physical locations of the system components that they represent. If subsystem2 40-2 were moved to another location in the room 70, the graphical representations of FIG. 3 would be updated to reflect any such change.

In addition to modifications to the graphical representations of combinations of system components, the user may also want to retrieve such graphical representations in order to obtain current status information for one or more of the system components. A system component, such as a disk drive, can have a number of status items that convey to the user its current state. With reference to FIG. 6 that diagrammatically illustrates an enlarged, fragmentary section of a system component, such as a disk drive, controller, fan, drive tray such status information might include whether or not power is applied to the system component represented by the graphical representation, whether one or more defined faults exist in the particular system component, an operational state of the system component and/or any other information beneficial to the user. Such status information may be conveyed by an indicator light or indicia that readily conveys to the user the identified state of that particular system component.

With respect to obtaining status information, in one embodiment, the computer apparatus 48 communicates with the storage array 24 and is able to access the requisite information from the storage array 24. In such an embodiment, the storage array 24, among other functions, continuously monitors predetermined states of one or more of the system components of the RAID system. After the user has such status information, the user can utilize it in connection with monitoring operations of the RAID system. As an example, when certain status indicates to the user that a change should be made to a particular system component, based on the graphical representations of the relative and absolute physical locations of the actual system components, the user can immediately correlate the system component having such status information with its actual physical location. In doing so, immediate physical access can be made of the actual system component for taking any appropriate action including, but not limited to, the previously discussed addition, removal, replacement and/or shifting of system components or modules.

It should be understood that a number of variations or embodiments of system components can be graphically represented. As one representative example, more than one rack may support components for a particular RAID system. Such a number of racks may constitute wall-to-wall racks in which the particular RAID system components are dispersed over a number of racks. The combination of graphical representations of such a system can accurately reflect the actual physical configuration thereof. In that regard, the display screen of the computer apparatus 48 can illustrate at the same time a number of racks that make up the particular RAID system. A first rack may have all drives with accompanying drive trays and a second rack may have controllers used in controlling the drives of the first rack. There can also be more than two racks, i.e., a third rack might have a mixture of some controllers controlling drives in the first rack, as well as drives in the second rack. Regardless of the physical configuration, the combination of graphical representations can accurately depict each such configuration. The graphical representations can be used to manage such a wall-to-wall rack embodiment, as well as provide updates based on changes to actual system components and provide status information for components of such a multiple rack variation. In another variation, the graphical representations may not include a rack. Instead, the modules may be stacked relative to each other in different three dimensional geometric configurations, such as based on a cube shape.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A method involving graphical representations of relative and absolute locations of system components, comprising:

providing a number of graphical representations of system components;

displaying, using a display semen of a computer system, at least a first plurality of said number of graphical representations, said first plurality to be used in defining a first system of components and including at least a first graphical representation related to a first component of said first system;

arranging said first plurality utilizing said computer system on said display screen, said arranging step including associating, using said display screen, each of said first plurality in a location relative to each of the other of said first plurality, said arranging step further including identifying, using said display screen, an absolute location of each of said first plurality, said relative and absolute locations of said first plurality on said display screen corresponding to actual relative and absolute physical locations of system components of said first system in a room housing said first system;

updating said fist graphical representation, based on a change related to said first component of said first system, after said arranging step; and said first plurality includes a second graphical representation related to a second component of said first system and said providing step includes storing in memory said first graphical representation having an object form for illustrating said first component and storing in memory said second graphical representation having an object form and text for illustrating said second component.

2. A method, as claimed in claim 1, wherein:

said updating step includes one of removing, moving, replacing and providing status information using said first graphical representation.

3. A method, as claimed in claim 1, wherein:

said updating step includes notifying said computer system of said change and modifying said first graphical representation by a use of said computer system after said notifying step.

4. A method, as claimed in claim 1, wherein:

said updating step includes notifying said computer system of said change and modifying said first graphical representation by said computer system after said notifying step.

5. A method, as claimed in claim 1, wherein:

said updating step includes providing status information related to said first component of said first system using said first graphical representation, with said status information being input to said computer system using said first system.

6. A method, as claimed in claim 1, wherein:

said displaying step includes displaying said first and second graphical representations of said first plurality separately from each other and said arranging step includes combining said first and second graphical representations under user control utilizing said computer system.

7. A method, as claimed in claim 6, wherein:

said object form of said first graphical representation includes a rack having a number of slots, said object form and text of said second graphical representation includes a controller and a controller identifier and wherein said step of combining includes inserting said second graphical representation into said first graphical representation and said inserting step is conducted based on actual relative and absolute physical locations of said first system components in the room and after said first system is configured in the room.

8. A method, as claimed in claim 1, wherein:

said identifying step comprises including on said display screen a name of the room in a building and the location of said first system components in the room relative to at lest one of the following: walls, ceiling, and floor of the room.

9. A method involving graphical representations of relative and absolute locations of system component, comprising:

providing a number of graphical representations of system components;

displaying, using a display screen of a computer system, at least a first plurality of said number of graphical representation, said first plurality to be used in defining a first system of components and including at least a first graphical representation related to a first component of said first system;

arranging said first plurality utilizing said computer system on said display screen, said arranging step including associating using said display screen, each of said first plurality in a location relative to each of the other of said first plurality, said arranging step further including identifying using said display screen, an absolute location of each of said first plurality, said relative and absolute locations of said first plurality display screen corresponding to actual relative and absolute physical locations of system components of said first system in a room housing, said first system;

updating said first graphical representation based on a change related to said first component of said first system, after said arranging step; and displaying, using said display screen, a second plurality of said number of graphical representations, with at least one of said second plurality being the same as one of said first plurality and presenting on said display screen each of said first and second pluralities, with said second plurality being presented in relative and absolute locations corresponding to actual relative and absolute physical locations of said components of said first and second systems in the room having said first and second systems components and including at least a first graphical representation related to a first component of said first system;

arranging said first plurality utilizing said computer system on said display screen, said arranging step including associating, using said display screen, each of said first plurality in a location relative to each of the other of said first plurality, said arranging step further including identifying, using said display screen, an absolute location of each of said first plurality, said relative and absolute locations of said first plurality on said display screen corresponding to actual relative and absolute physical locations of system components of said first system in a room housing said first system;

updating said first graphical representation, based on a change related to said first component of said first system, after said arranging step; and displaying, using said display screen, a second plurality of said number of graphical representation, with at least one of said second plurality being the same as one of said fist plurality and presenting on said display screen each of said first and second pluralities, with said second plurality being presented in relative and absolute locations corresponding to actual relative and absolute physical locations of said components of said first and second systems in the room having said first and second systems.

10. A method, as claimed in claim 9, further comprising:

ascertaining an actual physical location of said first component of said first system in the room having said first system using said first graphical representation of said first plurality being displayed on said display screen of said computer system.

11. A method, as claimed in claim 10, further comprising:

accessing by an operator said first component of said first system in the room based on said ascertaining step.

12. A method, as claimed in claim 11, further comprising:

modifying by the operator said first component of said first system.

13. A method, as claimed in claim 12, wherein:

said modifying step includes removal of said first component of said first system and replacing said first component with another component.

* * * * *